United States Patent [19]

Bernatets

[11] Patent Number: 4,676,251

[45] Date of Patent: Jun. 30, 1987

[54] IMPROVED METHOD AND DEVICE FOR MEASURING FREQUENCY DEPENDENT PARAMETERS OF OBJECTS BY MEANS OF ULTRASOUND ECHOGRAPHY

[75] Inventor: Jean-Luc Bernatets, Paris, France

[73] Assignee: U.S. Philips Corporation, New York, N.Y.

[21] Appl. No.: 714,230

[22] Filed: Mar. 21, 1985

[30] Foreign Application Priority Data

Apr. 10, 1984 [FR] France ................... 84 05637

[51] Int. Cl.⁴ ............................................. A61B 10/00
[52] U.S. Cl. ..................................... 128/660; 73/599
[58] Field of Search ....................... 128/660, 661, 600; 73/599, 602

[56] References Cited

U.S. PATENT DOCUMENTS

| | | | |
|---|---|---|---|
| 3,765,192 | 7/1972 | Fahrbach | 128/663 |
| 4,446,737 | 5/1984 | Hottier | 73/602 |
| 4,452,082 | 6/1984 | Miwa | 73/602 X |
| 4,511,984 | 4/1985 | Sumino et al. | 73/602 X |
| 4,564,019 | 1/1986 | Miwa | 128/660 |

Primary Examiner—William E. Kamm
Assistant Examiner—Francis J. Jaworski
Attorney, Agent, or Firm—Jack E. Haken

[57] ABSTRACT

A device for the scanning of media by means of ultrasound echography, comprising at least one ultrasonic transducer (10) which is associated with a transmitter stage (50) and with a receiver-stage which comprises a conventional first processing circuit (101, 102, 103) and a second processing circuit which is connected parallel thereto and which comprises a series connection of a circuit (210) for automatic gain control as a function of the distance of the echos, a heterodyne circuit (230), and n parallel channels, each of which comprises a series connection of a circuit for the correction of diffraction effects, a filter (240a . . . 240n) for selecting a narrow frequency band from the pass-band of the transducer, a logarithmic amplifier (250a . . . 250n) and a divider (260a . . . 260n) whose output is connected to one of the n inputs of a circuit (270) for determining values whose output is connected to the display device provided in the first processing circuit.

7 Claims, 1 Drawing Figure

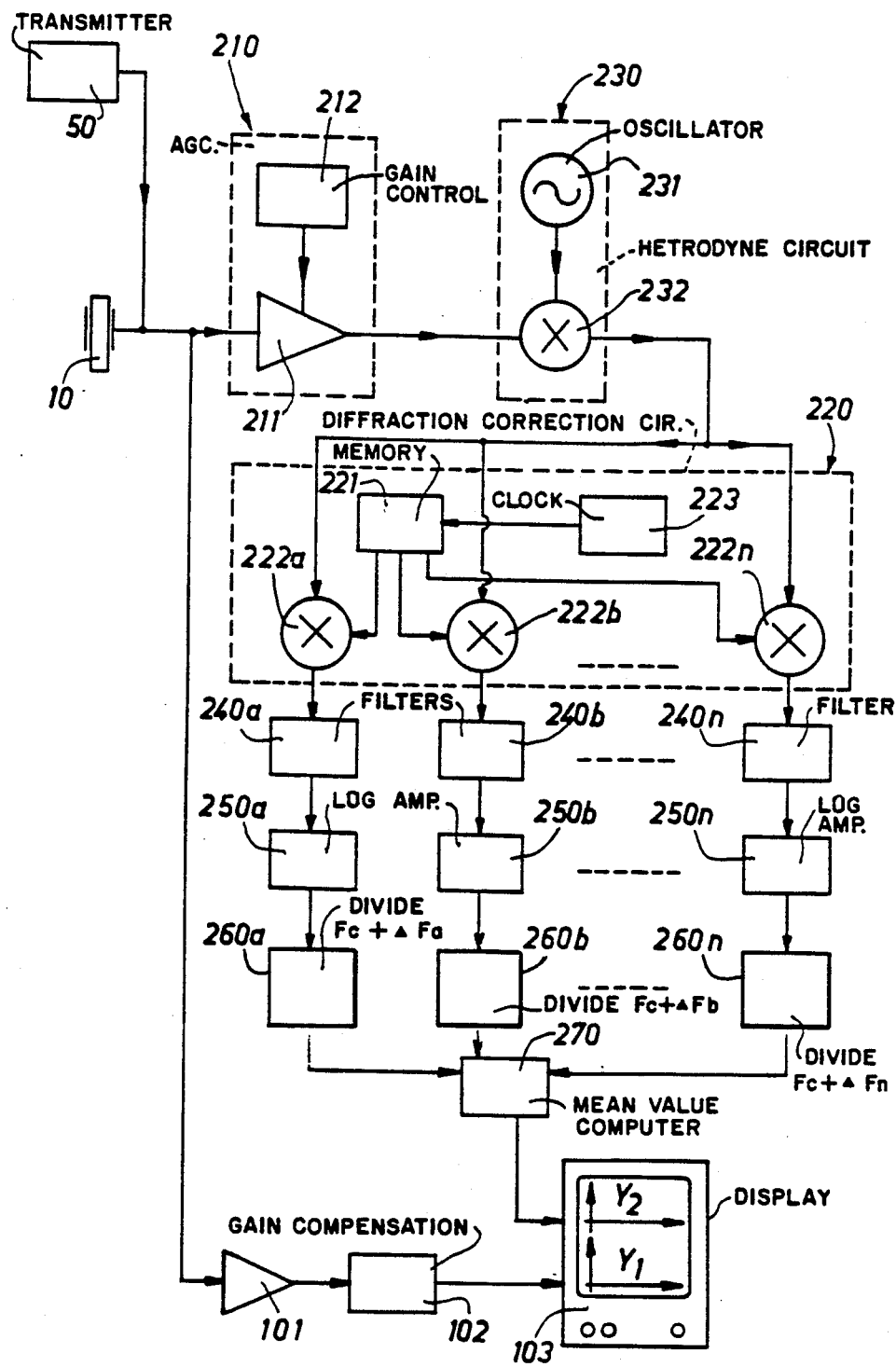

IMPROVED METHOD AND DEVICE FOR MEASURING FREQUENCY DEPENDENT PARAMETERS OF OBJECTS BY MEANS OF ULTRASOUND ECHOGRAPHY

The invention relates to a device for the scanning of objects, notably biological tissues, by means of ultrasound echography, which comprises at least one ultrasonic transducer which is associated with a transmitter stage for the repeated transmission of ulrasonic signals and with a receiver stage for receiving the ultrasonic echos which correspond to the principal obstacles encountered by the transmitted signals in their propagation direction, said receiver stage comprising a first circuit for the processing of the echos received which comprises essentially a first amplifier which is connected to the output electrode of the transducer, a gain compensation device and a device for displaying the positions of the echos in the propagation direction as a function of time as well as the amplitudes thereof, and also comprising a second processing circuit which is connected parallel to said first processing circuit.

BACKGROUND OF THE INVENTION

A device of this kind is described in French Patent Application No. 81 19 585, filed on Oct. 19, 1981. The first processing circuit of this device is of a conventional type and is composed mainly of a first amplifier for the signals present on the output electrode of the transducer, a gain compensation device and a display device. The second processing circuit, being connected parallel thereto, itself comprises (a) a second amplifier which is also connected to the output electrode of the transducer; (b) a group of n mutually parallel channels which are connected to the output of this second amplifier and each of which successively comprises a band-pass filter (the group of filters thus provided being such that their pass-bands are consecutive and span approximately the pass-band of the second amplifier) and an envelope detector (itself composed of a rectifier and a low-pass filter having a variable time constant); (c) an arithmetic circuit which is connected to the output of the n channels and which uses the output signals thereof in order to calculate a parameter which is an indicator for the spread of the amplitudes of the signals of central frequency of each channel and which is at the same time directly locally correlated with the mean slope (referred to as the differential ultrasonic attenuation factor) of the curve of the variation of the ultrasonic attenuation as a function of the frequency in the tissues scanned; and (d) a circuit which is connected to the output of this arithmetic circuit and which serves to determine the value of this factor whithin each of the zones bounded by the echos corresponding to the obstacles encountered in the tissues scanned, the output signals of the latter circuit providing modulation of the image presented on the display device.

A device having such a construction is interesting because it enables quantitative information to be derived by local calculation of a parameter which is directly related to the differential ultrasonic attenuation factor, followed by direct display of the values of this factor in A-type or B-type echograms. However, the results obtained by means of this device are affected by measurement noise which limits their accuracy.

SUMMARY OF THE INVENTION

It is the object of the invention to provide an apparatus of the kind set forth in which the measurement noise is eliminated or at least substantially reduced.

To achieve this, the device in accordance with the invention is characterized in that the second processing circuit comprises a series connection of a circuit for automatic gain control as a function of the distance of the echos, a heterodyne circuit which itself comprises an oscillator and a multiplier, and a group of n parallel channels which are connected to the output of the heterodyne circuit and each of which comprises a series connection of a circuit for the correction of diffraction effects, a filter for selecting a narrow frequency band from the pass-band of the transducer, a logarithmic amplifier, and a divider whose output is connected to one of the n inputs of a circuit for determining mean values whose output is connected to an input of the display device, said frequency bands being disjunct or at least non-overlapping.

In the proposed device only narrow frequency bands are considered in the successive instantaneous frequency spectra of the output signal of the transducer and instead of the determination of the differential ultrasonic attenuation factor on the basis of the measurement result in a single one of these frequency bands, a mean value is formed from the measurement results in several bands. Even though these measurement results are affected by substantial noise, the output signal obtained after formation of this mean value is less disturbed by this measurement noise and allows for more accurate determination of this differential ultrasonic attenuation factor. However, this effect is obtained only if said frequency bands do not overlap; a study of the correlation of noise in different bands has shown that their correlation coefficient is substantially zero when said frequency bands are disjunct or at least non-overlapping.

DESCRIPTION OF THE DRAWING

The characteristics and advantages of the invention will be better understood on the basis of the following description and the attached drawing, whose sole FIGURE shows an embodiment of the device for the scanning of media in accordance with the invention.

DESCRIPTION OF A PREFERRED EMBODIMENT

The device described with reference to said FIGURE comprises a single probe which forms the carrier of an ultrasound transducer 10 and which enables A-type echograms to be obtained. It will be apparent that the invention can be used in exactly the same way when instead of only one line a complete plane section of the tissues is examined, either by means of a probe which is connected to a radar-type display screen with manual displacement or with so-called mechanical sector scanning, or by means of a linear array of p ultrasound transducers which define a corresponding number of p parallel scanning directions in the tissues to be examined, said array being connected to a circuit for successively switching the echo processing device to each activated transducer or group of transducers, or also by means of an array of transducers with so-called electronic sector scanning which is also connected to a switching circuit for the processing device as well as to a network of delay lines or phase shifters.

The transducer 10 is connected on the one side to a transmitter stage 50 which enables the repeated transmission of ultrasound energy by the transducer in an arbitary scanning direction through the tissues to be examined, and on the other side to a receiver stage which serves to process the ultrasonic echos which are received by the transducer and which correspond to the principal obstacles encountered by the transmitted signals in their propagation direction. The situation of such obstacles is defined in the echograms by the echos of high amplitude which indicate the boundaries between tissues for which the differential ultrasonic attenuation factors are to be determined.

The receiver stage comprises in known manner a first circuit for the processing of the ultrasonic echos received, said circuit being composed of a first amplifier 101 (which is actually a preamplifier), a gain compensation device 102, and a display device 103. Via its output electrode, the transducer 10 is connected to the input of the amplifier 101, whose output signals are applied to the device 102, thus ensuring compensation for the amplitude of the echos as a function of the distance, followed by display on the device 103 in the form of an A-type echogram along an axis corresponding to the principal propagation direction of the transducer 10. The receiver stage also comprises a second processing circuit which is connected parallel to the first processing circuit and which is composed of a circuit 210 for automatic gain control as a function of the distance of the echos which is connected to the output electrode of the transducer 10, and a heterodyne circuit which is composed of an oscillator 231 and a multiplier 232, followed by a group of n parallel channels which are connected to the output of this circuit and each of which comprises a series connection of a circuit 220 for the correction of diffraction effects, a filter $240a \ldots 240n$ for selecting a narrow frequency band from the pass-band of the transducer, a logarithmic amplifier $250a \ldots 250n$, and a divider $260a \ldots 260n$ whose output is connected to one of the n inputs of a circuit 270 for determining mean values, the output of said circuit being connected to the input of the display device 102. Each divider $260i$ (i varying from a to n) divides its input signal by $F_C + \Delta F_i$, in which $F_C$ is the frequency of the oscillator 231 and $\Delta F_i$ is the central frequency of the frequency band selected by the filter $240i$, the frequency $F_C + \Delta F_i$ thus being the frequency which initially corresponds to the output signal of the channel i.

The operation of the receiver stage will now be described. Once the gain correction has been performed as a function of time, the frequency band of the signal thus obtained on the output of the circuit 210 is converted to a basic band by mixing this signal in the multiplier 232 with the output signal of the oscillator 231; this operation is followed, after correction for diffraction effects, by filtering in the band-pass filters $240a \ldots 240n$ of the n channels. The intensity of the ultrasonic energy in the frequency band corresponding to each of these channels is proportional to $e^{-\beta(F_C + \Delta F_i)d}$, in which $\beta$ is the different ultrasonic attenuation factor and d the distance of the tissues, so that on the output of the n dividers there are obtained n signals whose amplitude is directly locally correlated with the mean slope $\beta$ of the curve representing the variation of the ultrasonic attenuation as a function of time in the tissues scanned. If the aim is to express the value of the energy in each band selected, as this value I is proportional to $e^{-\beta(F_C + \Delta F_i)d}$, the curves $I_{dB} = f(d)$ would be straight lines, assuming that the other two parameters are constant; the mean slopes thereof then directly reflect the ultrasonic attenuation values when the units are suitably chosen.

However, if the aim is to form in the circuit 270 a mean value of the output of the n channels (or the output of a given number of these channels) which is possibly weighted, for example by way of coefficients taking into account the energy in each frequency band, the output signal of the circuit 270 will also be a straight line whose mean slope provides a value for the factor $\beta$, but this signal will be disturbed substantially less by the measurement noise than each of the individual output signals of the channels. The noise is thus substantially eliminated or at least greatly reduced.

The output signals of the gain compensation device 102 and the divider 260 then modulate the image presented on the display device 103 as follows in the present example: the image comprises on the one hand the conventional A-type echogram which is supplied by the first processing circuit via a first channel $Y_1$ of the device and on the other hand a stepped curve which is displayed via a second channel $Y_2$ of this device and which represents the different values of the ultrasonic attenuation factor between the boundaries defined by the echogram of the channel $Y_1$ (these boundaries correspond to the principal obstacles encountered in the tissues and are thus formed by the echos of high amplitude in said echogram of the channel $Y_1$).

The circuit 220 for the correction of diffraction effects consists mainly of a memory 221 and multipliers $222a \ldots 222n$. This memory is controlled by a clock circuit 223 and stores the signals required for correction as a function of the distance; these signals are applied to the multipliers $222a \ldots 222n$ and their values have been stored in advance after a preliminary calibration phase. For this calibration phase it suffices to take into account (in the case of a non-focussing transducer) the echographic responses of the relevant transducer when placed opposite a reflective metal surface which is successively arranged at all distances from the transducer which correspond to the usual depths during echographic examinations or, in the more frequently occurring case of a focussing transducer, the echographic responses obtained by using phantoms whose ultrasonic responses are well known, the responses thus obtained enabling the introduction of the correction coefficients into the memory 221 which is in this case a programmable read-only memory (PROM).

It is to be noted that a conventional automatic gain control circuit comprises a variable gain amplifier 211 which is controlled by the gain control circuit 212. For accuracy of this energy measurement performed in accordance with the invention it is desirable to immobilize the gain temporarily, i.e. during the actual measurement period, between two instants $t_1$ and $t_2$. This result is obtained by introducing a time window in the automatic gain control circuit 210 during which the variation of the gain of the amplifier is suspended.

What is claimed is:

1. In a method for determining ultrasonic attenuation parameters of a propagation medium which comprises the step of measuring the mean slope of the curve of variation of ultrasonic attenuation as a function of frequency in ultrasound echoes reflected from said medium, the improvement comprising separately measuring said slope in each of a plurality of narrow, non-overlapping frequency bands within the frequency spectrum of said echoes and calculating the mean value of the slopes so calculated to cancel the effects of noise which is uncorrelated between said frequency bands.

2. In a device for scanning objects by means of ultrasound echography of the type which comprises:

at least one ultrasound transducer; transmitter means connected to the transducer for repeated transmission of ultrasound energy; and receiver means connected to the transducer for receiving ultrasound echo signals which are produced from reflections of the transmitted energy, said receiver means comprising:

first signal processing means which includes an amplifier connected to receive signals from the output of the transducer, gain compensation means, and display means for displaying the positions of the origin of the echo signals together with the amplitude of the echo signals, and second signal processing means, connected in parallel with the first signal processing means, which include: automatic gain control means which increase the gain of the second signal processing means as a function of the distance of the position of the origin of the echo signals from the transducer; diffraction correcting means which correct the amplitude of the echo signals for diffraction effects produced by the transducer; frequency selection means which pass echo signals within the bandpass of the transducer; logarithmic amplifier means; and means which divide the output signal of the logarithmic amplifier by a factor which is proportional to a center frequency and apply the divided output signal to a display means; the improvement wherein:

the second signal processing means comprises, in functional series connection:

said automatic gain control means;

heterodyne circuit means for shifting the frequency of said echo signals;

a plurality of parallel signal processing channels each having an input connected to the output of the heterodyne circuit and comprising the functional series connection of means for correcting for said diffraction effects, a filter for passing a selected narrow frequency band within the bandpass of the transducer; a logarithmic amplifier; and dividing means which divide the output of said logarithmic amplifier by a factor proportional to the center frequency of the bandpass of said filter;

mean value computer means connected to the outputs of all of said parallel channels, which compute the mean value of the output signals of all of said dividing means and apply said mean value to said display means;

wherein the narrow bands of frequencies passed by the filters in said parallel channels are selected to be non-overlapping.

3. The device of claim 2 wherein the narrow band of frequencies passed by the filters in said parallel channels are selected to be disjunct.

4. In a device for determining relative values of the differential ultrasonic attenuation factor in zones of a biological tissue which comprises:

means for directing ultrasound energy into the tissue and for detecting signals representative of echoes of said energy which are produced in said tissue;

means for generating an image from said detected signals wherein the positions of boundaries of zones in the tissues are determined by points of origin of high amplitude echoes from said tissues;

means for correcting the values of said detected signals to compensate for variations in ultrasound field strength which are caused by transducer diffraction effect;

for one or more zones defined in the display, means for measuring a factor proportional to the energy of said returned echoes in said detected signal;

means for calculating a value $\beta$ from said energy value which is proportional to the differential ultrasonic attenuation factor; and means for displaying the calculated value of $\beta$ in association with each of the displayed zones; the improvement wherein the device comprises:

a plurality of parallel channels each including means for measuring a factor, I, proportional to the intensity of energy of the returned echoes in a distinct narrow frequency band of the detected signals and means for calculating a value $\beta_i$ from said energy utilizing the formula $I = e^{-\beta_i(F_c + \Delta F_i)d}$ where $(F_c + \Delta F_i)$ is the center frequency of said narrow frequency band and d is the distance which the echoes travel through the tissue from the zone to the point of detection; and means which calculate the mean value of the values of $\beta_i$ which are determined by each of said parallel channels and display said mean value as the calculated value of $\beta$ in association with said displayed zones, wherein the narrow bands of frequencies in all of said parallel channels are non-overlapping.

5. The device of claim 4 wherein the narrow bands of frequencies in all of said parallel channels are disjunct.

6. A method for determining relative values of the differential ultrasonic attenuation factor in zone of a biological tissue, comprising the steps of:

directing ultrasound energy into the tissue and detecting signals representative of echoes of said energy which are produced in said tissue;

generating an image from said detected signals wherein the positions of boundaries of zones in the tissue are determined by the points of origin of high amplitude echoes from said tissues;

correcting the values of said detected signals to compensate for variations in ultrasound field strength which are caused by transducer diffraction effects;

for one or more zones defined in the display, measuring a factor proportional to the energy of said returned echoes in a narrow frequency band of said detected signals; and calculating a value $\beta$ which is proportional to the differential ultrasonic attenuation factor from each of said energy values; and displaying the calculated value of $\beta$ in association with each of the displayed zones, the improvement wherein:

the step of measuring a factor proportional to the energy of the returned echoes comprises measuring said factor I in each of a plurality of selected narrow, non-overlapping frequency bands in the detected signals; and the step of calculating the value of $\beta$ comprises calculating separate values $\beta_i$ in each of said narrow frequency bands utilizing the formula $I = e^{-\beta_i(F_c + \Delta F_i)d}$ wherein $(F_c + \Delta F_i)$ is the center frequency of the particular narrow frequency band utilized and d is the distance from the origin of said echo to the point of detection; and then determining the mean value of the factors $\beta_i$ calculated in each of said narrow frequency bands.

7. The method of claim 6 wherein said plurality of narrow frequency bands are disjunct.

* * * * *